US007296019B1

(12) United States Patent  
Chandrasekar et al.

(10) Patent No.: US 7,296,019 B1
(45) Date of Patent: Nov. 13, 2007

(54) SYSTEM AND METHODS FOR PROVIDING RUNTIME SPELLING ANALYSIS AND CORRECTION

(75) Inventors: Raman Chandrasekar, Seattle, WA (US); Ray Sun, Issaquah, WA (US); Thomas Dale White, Carnation, WA (US); Zhanliang Chen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 442 days.

(21) Appl. No.: 10/972,593

(22) Filed: Oct. 25, 2004

Related U.S. Application Data

(63) Continuation of application No. 10/004,490, filed on Oct. 23, 2001, now abandoned.

(51) Int. Cl.
G06F 17/30 (2006.01)
G06F 7/00 (2006.01)

(52) U.S. Cl. ............... 707/6; 707/4; 707/5; 707/10; 707/2

(58) Field of Classification Search ........... 707/10, 707/2, 3, 5, 6, 4
See application file for complete search history.

(56) References Cited

U.S. PATENT DOCUMENTS

| 6,006,225 | A  | * | 12/1999 | Bowman et al. ............ 707/5 |
| 6,018,735 | A  | * | 1/2000  | Hunter ....................... 707/5 |
| 6,401,084 | B1 | * | 6/2002  | Ortega et al. ............... 707/2 |
| 6,526,440 | B1 |   | 2/2003  | Bharat ...................... 709/219 |
| 6,529,903 | B2 |   | 3/2003  | Smith et al. ................ 707/7 |
| 6,615,209 | B1 |   | 9/2003  | Gomes et al. .............. 707/5 |
| 6,658,423 | B1 |   | 12/2003 | Pugh et al. ................ 707/102 |
| 6,678,681 | B1 |   | 1/2004  | Brin ........................ 707/6 |
| 2001/0032204 | A1 | * | 10/2001 | Hoashi et al. ............. 707/5 |
| 2002/0059204 | A1 | * | 5/2002  | Harris ...................... 707/3 |
| 2002/0123988 | A1 |   | 9/2002  | Dean et al. ................ 707/3 |
| 2002/0133481 | A1 |   | 9/2002  | Smith et al. ............... 707/3 |
| 2002/0152204 | A1 | * | 10/2002 | Ortega et al. .............. 707/3 |
| 2002/0194229 | A1 | * | 12/2002 | Decime et al. ............. 707/533 |
| 2003/0037077 | A1 | * | 2/2003  | Brill et al. ................ 707/533 |
| 2003/0069877 | A1 | * | 4/2003  | Grefenstette et al. ....... 707/2 |
| 2003/0084041 | A1 | * | 5/2003  | Dettinger .................. 707/5 |

OTHER PUBLICATIONS

Belonogov, G.G. et al., "An experimental system for automatic detection and correction of spelling errors in texts," *Automatic Documentation and Mathematical Linguistics*, 1984, 18(2), 36-40.

(Continued)

*Primary Examiner*—Kuen S. Lu
(74) *Attorney, Agent, or Firm*—Woodcock Washburn LLP

(57) ABSTRACT

A system and methods are provided for runtime spelling analysis and correction in a computing system. Misspelled entries or input text is automatically corrected turning the misspelled entries or input text into valid entries or text. The words used for spell checking and correction may be collected through multiple channels or from multiple sources, including words commonly found on the Web, and in users' entries or input text, as well as words from a standard language lexicon, all of which may be in one or more languages. The word(s) are automatically corrected only when there is a very high confidence that the correction is desirable. In various embodiments, the system implements a plurality of mechanisms with which the user can override the correction if invoked.

18 Claims, 11 Drawing Sheets

OTHER PUBLICATIONS

Berman, C., "A system to watch all your Ps and Qs (spelling checkers)," *Computing*, 1982, 10(35), 22-23.

Brin, S. et al., "The Anatomy of a Large-Scale Hypertextual Web Search Engine," Aug. 7, 2000, 1-20.

Ditlea, S., "How well do you spell?" *Personal Computing*, 1987, 11(3), 91-93.

Dolgopolov, A.S., "A program of automatic text correction," *Automatic Documentation and Mathematical Linguistics*, 1986, 20(2), 116-121.

Ito, T., "Correcting spelling errors in English sentences," *Information Proc. Soc. Japan*, 1984, 25(5), 471-479.

Jinkerson, L.A., "Computer Spelling Checkers: An Example Cognitive Tool," *Proceedings of the ICLS 96, Second International Conference on the Learning Sciences*, Evanston, Illinois, Jul. 25-27, 1996, 427-432.

Levenshtein, V., "Binary Codes Capable of Correcting Deletions, Insertions, and Reversals," *Soviet Physics—Doklady*, Feb. 1966, 10(8), 707-710.

Pollock, J.J., "Spelling error detection and correction by computer: some notes and a bibliography," *J. Documentation*, 1982, 38(4), 282-291.

* cited by examiner

SYSTEM AND METHODS FOR PROVIDING RUNTIME SPELLING ANALYSIS AND CORRECTION

CROSS REFERENCE TO RELATED APPLICATIONS

This application is a continuation of U.S. patent application Ser. No. 10/004,490 filed Oct. 23, 2001 now abandoned.

NOTICE OF TRADEMARK USE

The names of any actual recording artists or Web sites referred to herein are trademarks of their respective owners. No association with any recording artist is intended or should be inferred.

FIELD OF THE INVENTION

The present invention relates to the provision of automatic spelling analysis and correction in a computing system. More particularly, the present invention relates to the provision of automatic spelling analysis and correction for a runtime service in a computing system.

BACKGROUND OF THE INVENTION

As the use of search engines and other applications having text based query input becomes more ubiquitous, so have the chances for the occurrence of a number and variety of spelling errors in users' input. Queries with wrong spellings in the query entry mechanism tend to result in no matching results, or tend at least to result in results ill reflective of the users' intention due to the error(s) input to the query entry mechanism.

The graph of FIG. 1 depicts an approximate number of unmatched queries detected in an exemplary user input data set. Examples of misspellings include: kareoke, abrahm lincoln, sophmore and pregnacy. As one might predict, the number of misspellings increases as the query log is delved into more deeply, towards less frequent queries.

An existing problem is that it is not easy for users to realize that they have made a mistake. A user may become dissatisfied as a result, or users who spell poorly may not be privileged with the best results. Users would have a better experience if a search engine or other service could somehow correct their mistakes, and return results corresponding to what the users meant or intended to ask.

There are other related issues, such as ease of extensibility. Given the dynamic nature of the Web, and the fact that users' queries reflect the changing world, it would be advantageous to update the standard against which mistakes are tested regularly and in real-time.

The expanding reach of the Web, and the diverse background and spelling abilities of users, coupled with esoteric names and phrases for which people now search, makes it easy to predict with a high probability that many new unmatched queries will be input frequently. Many of these queries are misspellings of known words or phrases. Some are phrases with intervening blanks deleted, i.e., "squished words." Some are URL fragments, and so on. For the convenience of the present discussion, any query entered having at least one error may be considered a misspelling. Based on preliminary empirical query log data, according to one study, it is estimated that between 3% and 5% of all queries are misspelled. Queries with misspellings may result in no matching results, or irrelevant results. Worse yet, the user may have no idea that the error occurred while inputting the query. At a minimum, the input of a query having at least one error in the query wastes computing time and resources, as well as the user's time from entry of the misspelled query to the discovery of the misspelling.

There are several spelling correction ('speller') programs for correction of text in word-processors. However, the requirements for runtime spelling correction are different than for word-processors. In particular, word processors do not demand a real-time up-to-date dictionary to function properly; it is the very "standard" nature of a language not to change that would make such a dynamic dictionary not as necessary for a word processor, and the user may nonetheless enter words that the user truly wishes for the word processing dictionary to accept as correct. For a word processing application, the user wishes to depend upon the word processor to indicate when, e.g., an English word is used incorrectly. Thus, to expand the Oxford English dictionary to include the phrase "STAIND®," a popular modern rock band, might otherwise undermine the ability of the dictionary to differentiate for the correct English word "stained." Any time an update truly needs to be made to the static dictionary used with a word processor, an update is delivered to the static store location of the dictionary, or as mentioned, the user may manually add words to the dictionary. Since such an update does not need to be frequently made and because the process does not attempt to include culturally based, fleeting or most Web-specific terminology, this process is not unduly burdensome and works for word processing applications.

Thus, the dictionary store for a word processor is not dynamically updated and word processors store a static dictionary in a commonly accessible location, such as on the client computer. As one can see, the operation of automatic spelling correction in connection with a word processing application is different than for corresponding runtime applications and services, such as Web searching. In short, to obtain a rich user experience, more than a primarily static, co-located standard written language dictionary is required for runtime services.

While spelling correction has been employed for word processors and other static contexts, there are many contexts that apply runtime techniques against dynamic data. Thus, for instance, the application of spelling correction to a word processor is different from the application of spelling correction to search engine queries, where proper names of people, companies ("siti nurhaliza", "junglee"), squished words such as "marketingcompanies," foreign words and phrases ("Concierto de Aranjuez") are common. Web queries are often devoid of any consistent case information, making it hard to detect proper names. Similarly, squished words are hard to detect without a lexicon. To further illustrate, a general dictionary used for word processing contains about 200,000 words, whereas a Web English lexicon has about 500,000 words, all of which are dynamically maintained.

For instance, pop star Britney Spears may have many different associated misspellings, and pop culture is ever changing, and so the Web English lexicon is a dynamically updated data store to reflect the dynamic nature of the data stored therein. In one informal test, it was observed that there are 88 known spelling variants of Britney Spears, which cover about 95% of the errors people make and consequently it would be advantageous to provide a runtime spell check mechanism that can adapt to names from popular culture, and other popular Web-specific search items. Thus, there is a need for a more comprehensive implementation of a dynamic lexicon for spellchecking of Web queries and similar material, or other queries for other services.

In this regard, it would be desirable to provide a runtime mechanism for analyzing spelling and alerting a user that a misspelling has occurred. Some systems today, such as one may find on a Web site such as GOOGLE.COM® or ALTAVISTA.COM®, include such a mechanism, although there are the drawbacks associated with these present approaches. Other such systems, such as MERRIAM WEBSTER®'s on-line dictionary, make spelling suggestions to a user, although there are drawbacks associated with these techniques as well.

With the systems of GOOGLE.COM®, ALTAVISTA.COM®, when a user wishes to perform a search for Web pages having a word X therein, the user enters the desired search terms in a text box. In the case of a misspelling, for instance if the user misspells the word X and spells it X1 instead, the search engine performs a search on X1 and returns the list of results having X1 therein, but also the search engine analyzes the input, in this case X1, and based upon a certain confidence calculation, determines that X may have been the appropriate input. If correct in its determination, however, the user must still assent to the additional search operation of the correct word X by making further operation, e.g., by re-inputting X for a further search. As mentioned, some runtime services do provide some level of spelling analysis. Thus, GOOGLE®, ALTAVISTA.COM®, etc. provide spelling correction at different levels, but they rely on users choosing a particular spelling alternative, or force the user to type in a new query based on spelling suggestions or tips provided. These services, however, do not automatically choose a high-confidence correction, and then utilize the high-confidence correction to search as the search query, while allowing the user to ignore the correction and search on the original query if that was indeed the intent.

With the system of MERRIAM WEBSTER®'s on-line dictionary, alternate spellings are proposed for misspelled words, but a user must select a correctly spelled word from a list of words within a threshold distance metric of the misspelled word in order to proceed. While this may be adequate for some purposes, e.g., perhaps when the user doe not even know how to correctly spell the word, in other contexts, it is clear not only that the user has made an error, but also what the error is. In those instances, a system that merely offers suggestions will make no such intelligent determination, and require further effort from the user.

There is thus a need for a mechanism that may be used in connection with a query input operation to decipher when a misspelling or an error has occurred. There is a further need for a mechanism that may be used in connection with a text-based query input operation to decipher when a misspelling or an error has occurred with a high confidence. There is still further a need for a mechanism that performs the operation associated with the query input as if the misspelling or error had not occurred. There is still even further a need for a mechanism that determines whether a misspelling or an error has occurred in a query input operation vis-a-vis a plurality of dynamic data stores or sources, such as a dynamically updated Web-oriented dictionary combined with a static dictionary store.

SUMMARY OF THE INVENTION

In view of the foregoing, for an overall better user experience, the present invention provides a system and methods for providing runtime spelling analysis and correction in a computing system. At run-time, the invention automatically corrects misspelled queries, turning misspelled queries into valid ones. The words used for spell checking and correction may be collected through multiple channels or from multiple sources, including words commonly found on the Web, and in users' queries, as well as words from a standard language lexicon, all of which may be in one or more languages. The word(s) are automatically corrected only when there is a very high confidence that the correction is desirable. In various embodiments, the system implements a plurality of mechanisms with which the user can override the correction if invoked.

Other features and embodiments of the present invention are described below.

BRIEF DESCRIPTION OF THE DRAWINGS

The system and methods for providing runtime spelling analysis and correction in a computing system are further described with reference to the accompanying drawings in which.

DETAILED DESCRIPTION OF ILLUSTRATIVE EMBODIMENTS

Overview

In accordance with the present invention, a method and system are provided for runtime detection and correction of user's spelling error(s) so that users have an overall better experience in connection with a network-based service having a text-based query mechanism. The invention converts misspelled queries into valid ones where a high confidence exists for a single choice extracted from a list of one or more alternative valid queries. Thresholds for when to make an auto-correction may be adjusted for the needs of a service. In embodiments wherein a search engine is the service, a very high bar is set for the thresholds, so that the system is very confident that the user has made an error and also confident about how to uniquely correct the error. The invention additionally provides a plurality of mechanisms by which the user can override the auto-correction afterwards.

In various embodiments of the system and methods for providing the text-based query service, the present invention advantageously provides: (1) automatic correction of error(s) with high confidence, (2) the use of the corrected version in providing service results, (3) the use of a Web lexicon to supplement a general English (or other language) lexicon, (4) the automatic augmentation of the Web lexicon using concepts and keyphrases defined in a search engine Web directory, (5) the option for the user to ignore the suggested alternative and search on exactly what the user originally specified (6) multiple methods by which a user can still search on the original query after auto-correction has occurred and (7) automatic correction of error(s) vis-à-vis at least one dynamically updated dictionary of terms.

Exemplary Network Environments

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Figure 1:
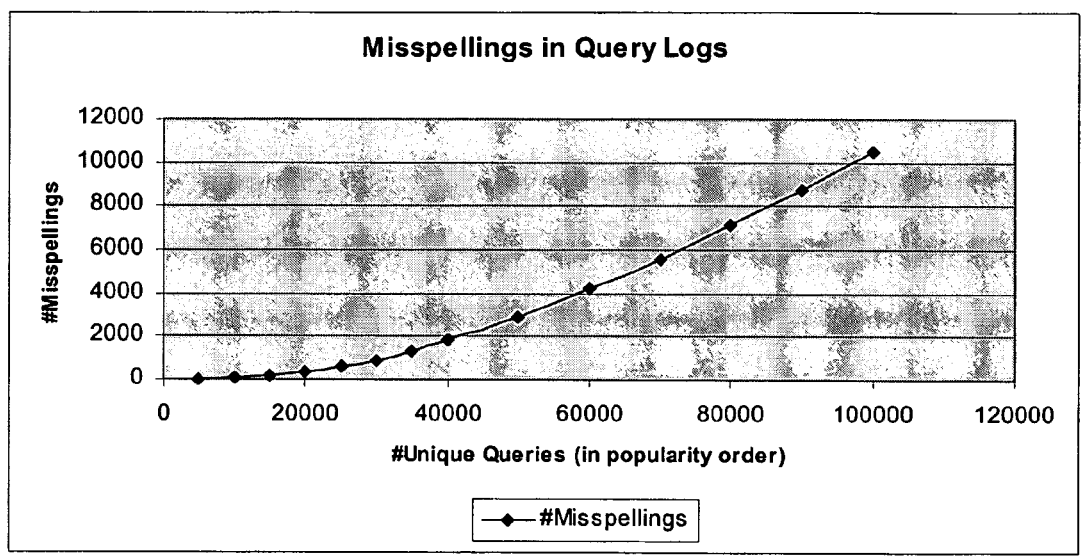
FIG. 1 is a graph based upon exemplary input data showing that the number of spelling mistakes made in a text-based query entry can be significant.
Figure 2A:
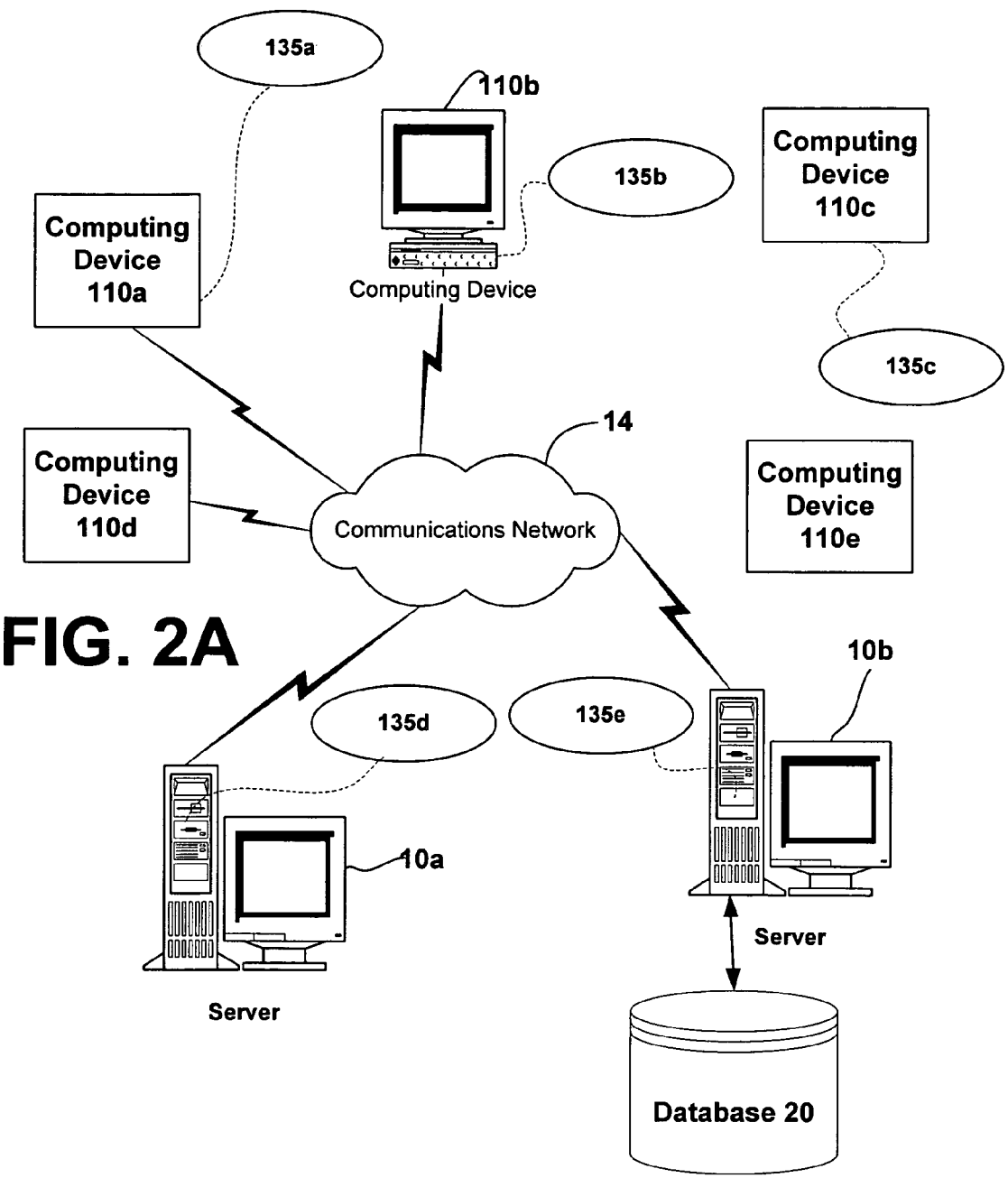
FIG. 2A is a block diagram representing an exemplary network environment having a variety of computing devices in which the present invention may be implemented.

FIG. 2A illustrates an exemplary network environment, with a server in communication with client computers via a network, in which the present invention may be employed. As shown, a number of servers 10a, 10b, etc., are interconnected via a communications network 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, and the like in accordance with the present invention. It is thus contemplated that the present invention may apply to any computing device in connection with which it is desirable to perform runtime spelling analysis and correction when rendering services.

In a network environment in which the communications network 14 is the Internet, for example, the servers 10 can be Web servers with which the clients 110a, 110b, 110c, 110d, 110e, etc. communicate via any of a number of known protocols such as hypertext transfer protocol (HTTP). Communications may be wired or wireless, where appropriate. Client devices 110 may or may not communicate via communications network 14, and may have independent communications associated therewith. For example, in the case of a TV or VCR, there may or may not be a networked aspect to the control thereof. Each client computer 110 and server computer 10 may be equipped with various application program modules 135 and with connections or access to various types of storage elements or objects, across which files may be stored or to which portion(s) of files may be downloaded or migrated. Any server 10a, 10b, etc. may be responsible for the maintenance and updating of a database 20 or other storage element in accordance with the present invention, such as a database 20 for storing lexicon or other data of the present invention. Thus, the present invention can be utilized in a computer network environment having client computers 110a, 110b, etc. that can access and interact with a computer network 14 and server computers 10a, 10b, etc. that may interact with client computers 110a, 110b, etc. and other devices 111 and databases 20.

Exemplary Computing Device

Figure 2B:
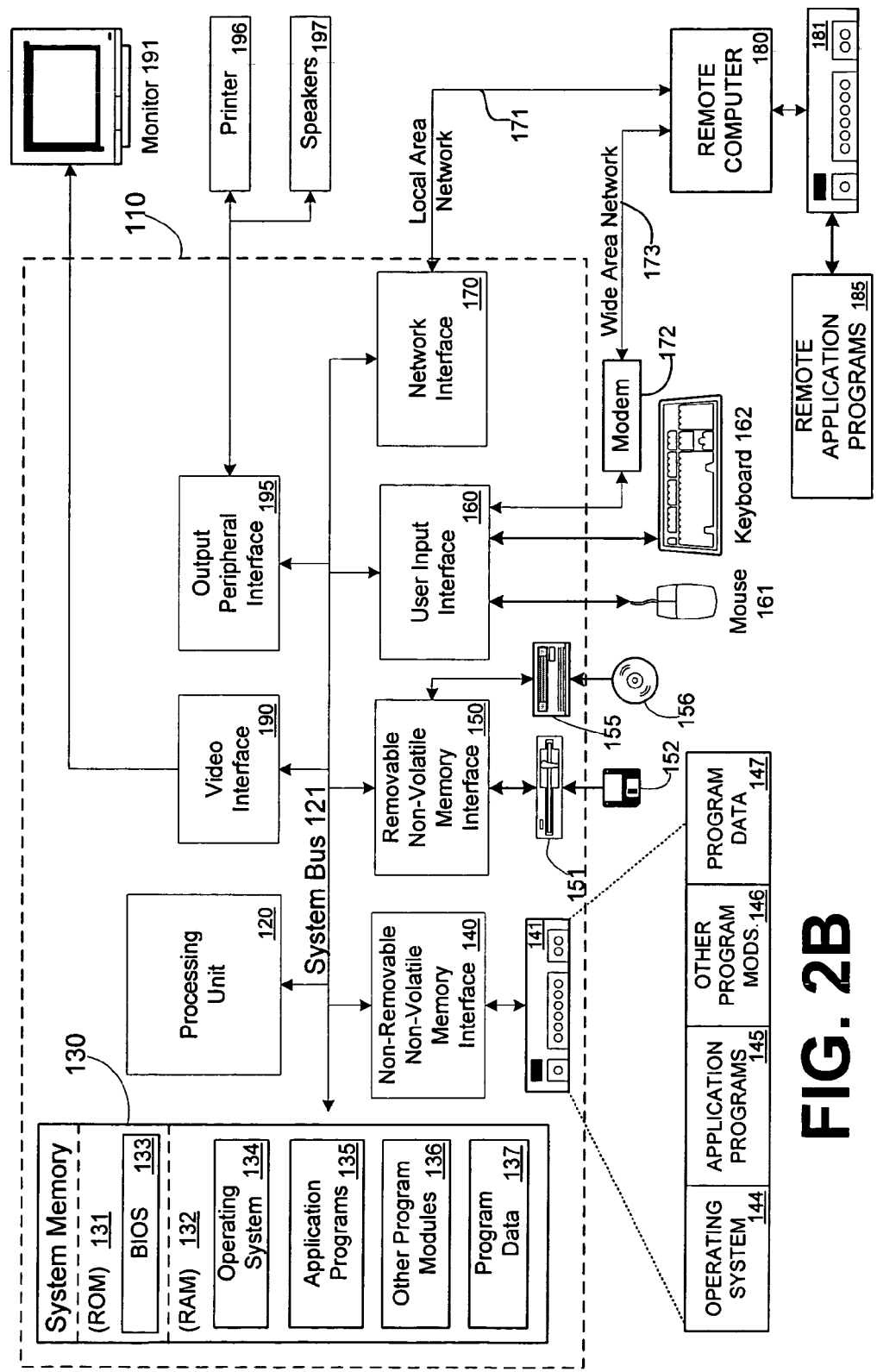
FIG. 2B is a block diagram representing an exemplary non-limiting computing device in which the present invention may be implemented.

FIG. 2B and the following discussion are intended to provide a brief general description of a suitable computing environment in which the invention may be implemented. It should be understood, however, that handheld, portable and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted serves in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, handheld or laptop devices, multi-processor systems, microprocessor-based systems, programmable consumer electronics, network PCs, minicomputers, mainframe computers and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 2B thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 2B, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2B illustrates operating system 134, application programs 135, other program modules 136, and program data 137.

The computer 110 may also include other removable/non-removable, volatile/nonvolatile computer storage media. By way of example only, FIG. 2B illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2B provide storage of computer readable instructions, data structures, program modules and other data for the computer 110. In FIG. 2B, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2B. The logical connections depicted in FIG. 2B include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2B illustrates remote application programs 185 as residing on memory device 181. It will be appreciated that the network connections shown are exemplary and other means of establishing a communications link between the computers may be used.

.NET Framework

.Net is a computer framework that has been developed in light of the convergence of personal computing and the Internet. Individuals and business users alike are provided with a seamlessly interoperable and Web-enabled interface for applications and computing devices, making computing activities increasingly Web browser or network-oriented. In general, the .Net platform includes servers, building-block services, such as Web-based data storage and downloadable device software.

Generally speaking, the .Net platform provides (1) the ability to make the entire range of computing devices work together and to have user information automatically updated and synchronized on all of them, (2) increased interactive capability for Web sites, enabled by greater use of XML (Extensible Markup Language) rather than HTML, (3) online services that feature customized access and delivery of products and services to the user from a central starting point for the management of various applications, such as e-mail, for example, or software, such as Office .Net, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform integration features as well. While exemplary embodiments herein are described in connection with software residing on a server and/or client computer, portions of the invention may also be implemented via an application programming interface (API) for a particular programming language, such that the runtime spelling correction of the present invention may be supported in or accessed through all of Microsoft's .NET languages and services.

Runtime Query Spellchecking

As mentioned above, the present invention provides several benefits to a user of a text-based query service. For example, in various embodiments of the system and methods used in connection with a search engine, the present invention advantageously provides: (1) automatic correction of error(s) with high confidence, (2) the use of the corrected version in searching for results, (3) the use of a Web lexicon to supplement a general English (or other language) lexicon, (4) the automatic augmentation of the Web lexicon using concepts and keyphrases defined in a search engine Web directory, (5) the option for the user to ignore the suggested alternative and search on exactly what the user originally specified (6) multiple methods by which a user can still search on the original query after auto-correction has occurred and (7) automatic correction of error(s) vis-à-vis at least one dynamic dictionary of terms.

An exemplary user scenario for the invention may be as follows: The user types a misspelled query, e.g., "tooothpaste." Pursuant to auto-correction techniques of the methods and system of the invention, the user's query is automatically changed to "toothpaste," and then the system proceeds to search for results based on the auto-corrected query.

In this example, the user receives search results for "toothpaste," or receives some other service based on the auto-corrected word. Previously, the user would have received poor results requiring the user to notice the misspelling and to retype the query to perform the query correctly.

If the auto-correction was incorrect, the rarity of which may be set as a parameter, the user may click the link beneath the input box labeled with the original non-corrected entry, in this case "Search for 'tooothpaste'". If the user clicks on the link with the original non-corrected entry, the user receives "toothpaste" results as if there had been no spell-checking. Alternatively, the user can retype the same spelling "tooothpaste", and receive results for "tooothpaste" without any correction, since the system regards the second entry of "tooothpaste" as an override of the auto-correct function.

While search engines are a prototypical service around which a discussion about text-based query entry may be designed, any service is contemplated by the invention. For example, a real estate service may have an auto-correct function for high confidence misspellings of input geographical locations. Thus, one of ordinary skill in the art can appreciate that the present invention applies to any service wherein a text-based entry can be tested against the results of a high confidence mis-entry comparison algorithm, performs auto-correction if necessary and performs the service based upon the auto-corrected result.

The invention works with any spelling correction component and is thus independent of the actual spelling algorithm used during runtime query analysis to determine similarity between and among words from a dynamic dictionary. In the following examples, the English language is utilized, although one of ordinary skill in the art can appreciate that the principles described herein hold for all languages, cultures, etc.

For purposes of the present description, the present invention defines a "general English lexicon" to be a dictionary of standard English words, and a "Web English dictionary" to be a list of words compiled from information about popular Web sites.

The service, such as a search engine, that is described herein may have more than one service provider, such as more than one provider of search results, and results from more than one provider may be combined according to algorithms tailored to the search provided for the user, e.g., the search results of multiple providers of search results may be merged, removing redundancy from the results. In turn, any correction that is made to the search query is propagated to all service providers.

Figure 3:
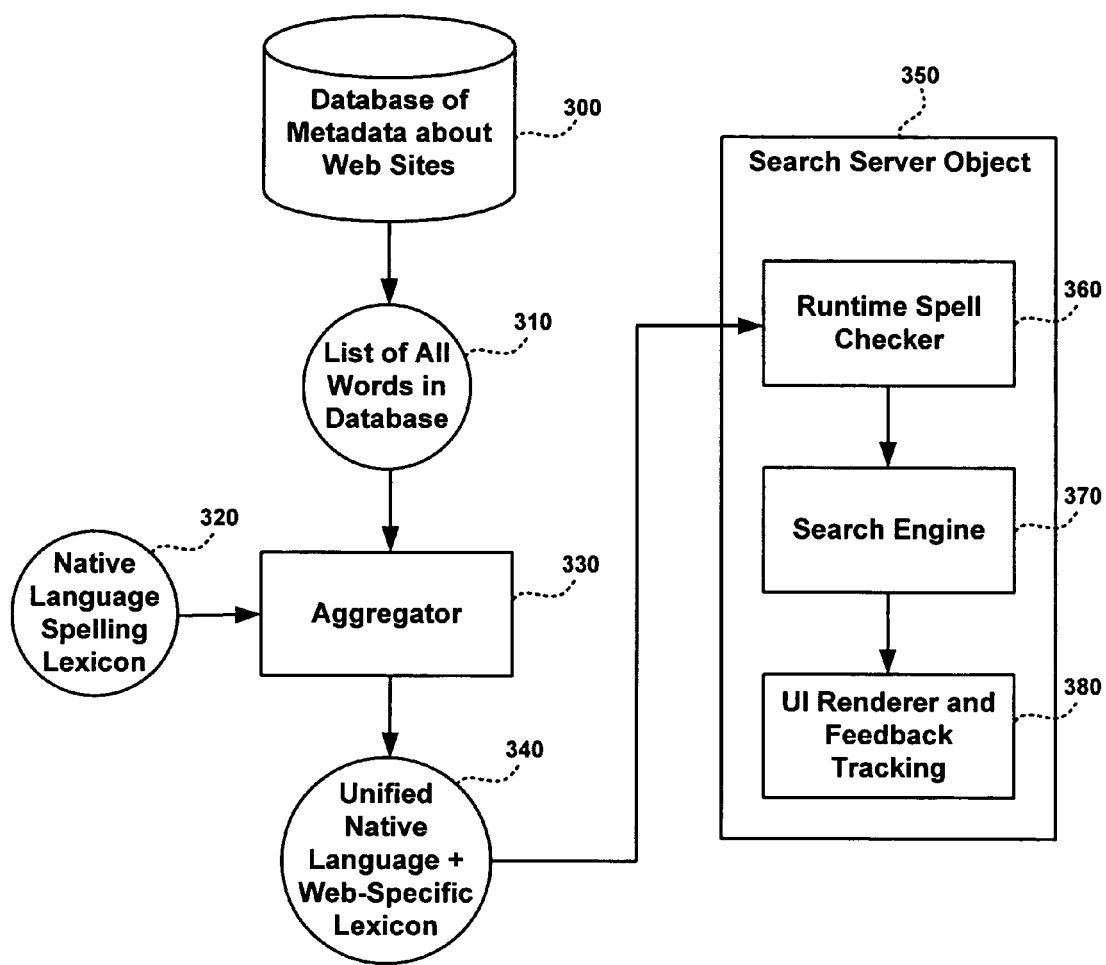
FIG. 3 presents an exemplary architecture for a service having runtime spelling correction capabilities in accordance with the present invention.

FIG. 3 presents an exemplary block and flow diagram for a service, such as a search engine, having the runtime spelling correction of the present invention. A list of all words in database 300 having metadata about Web sites is compiled at 310. The list compiled at 310 is combined with words from a native language spelling lexicon 320 by aggregator 330 yielding a unified native language and Web-specific lexicon 340, hereinafter unified lexicon. The concepts of the unified lexicon may be extended to N lists of input providers, such as N dictionaries and/or other data stores. The unified lexicon 340 is input to a search server object (SSO) 350 having a runtime spell checker 360, a service such as a search engine 370 and a user interface (UI) renderer and feedback tracking component 380. Runtime spell checker 360 checks the user input query against the words in the unified lexicon 340, and then according to methods such as well known nearest neighbor techniques, the spell checker determines with high confidence whether the user input is an error and whether the error is correctable to a singularly identifiable solution. If correctable with high confidence to a single solution, the search engine 370 then automatically performs the search on the solution without any further action on the part of the user. The results are displayed via the UI rendering component 380, and the user is given multiple opportunities at this point to choose the original uncorrected query, although the algorithms of the present invention make the likelihood of mis-correction very low.

The architecture of the present invention may include a runtime extension component, such as described in commonly assigned U.S. patent application Ser. No. xx/yyy,zzz, filed Month Day, Year and entitled "Title of the 'zzz Application." As noted above, the present invention is not limited to Web-based services, but rather the techniques of the present invention can be used in any interactive client-server context wherein a user of the client types in text in connection with a service offered by the server.

For purposes of the description of the invention, what constitutes a misspelling is broadly defined. A misspelling for purposes of the invention is a word or words where the user intended another unique word or words but mistyped it or them. Intent is always hard to measure, but a system may apply a set of rules to help sort out different types of misspellings. For instance, errors in phrases, squishing multiple words, universal resource locator (URL) fragments, proper names, adult terms, etc. are all scenarios that are considered potential misspellings in accordance with the invention.

Exemplary non-limiting rules for sorting different spellings include the following. Some misspellings are either URL fragments or squished words, such as 'marketingcompanies,' and the present invention applies rules to recognizing the complete URL or words that comprise the squished words. Squished words are correct if there is a reasonable Web meaning. In the case where there is not a reasonable Web meaning, a valid misspelling map can be "marketingcompanies→marketing companies" where the two words are in the lexicon. URL fragments are misspelled if the speller algorithm determines that the user's intent was another site e.g., "yhaoo.com" queries get turned into "yahoo.com." These are examples of unmatched queries which, if identified, can be handled in special ways to improve overall user experience, e.g., code to fix squished words, and handle names and other categories appropriately. Squished words can be handled by a simple maximal-length match plus back-off strategy, or using weights learned from a training set.

If a word is misspelled in the English sense but a reasonable Web meaning exists, the invention assumes that the spelling is correct, e.g., Kracker is not Cracker if Kracker.com is a valid Web site. Foreign words and proper names are not treated according to any special rules and are tested against the unified database 340 as usual. Non-alphanumeric characters, e.g., the "!" in yahoo! and the "@" in seti@home, are correct if there is a reasonable Web meaning. Numbers and words of an adult nature are not judged as misspelled or correct, i.e., numbers and words of an adult nature are not tested or corrected. Words having fewer than four characters and words having greater than twenty-nine characters are also not tested or corrected. Note that 'four' and 'twenty-nine' are configurable variables.

As presented in the background, spelling errors are sufficiently common as to make online spelling correction useful. With the present invention, however, a correction is only made if there is one unambiguous word that closely relates to the users' intent. The above exemplary rules have thus been designed in part with this goal in mind.

Thus, when the user types in a query such as "toothpaste", the system automatically corrects it to the query "toothpaste," and executes a search on the corrected version. An 'undo' link or other commonly implemented input means is added below or near the query box, so that if the user clicks on the undo link, a new search is executed on the user's original query.

Figure 4A:
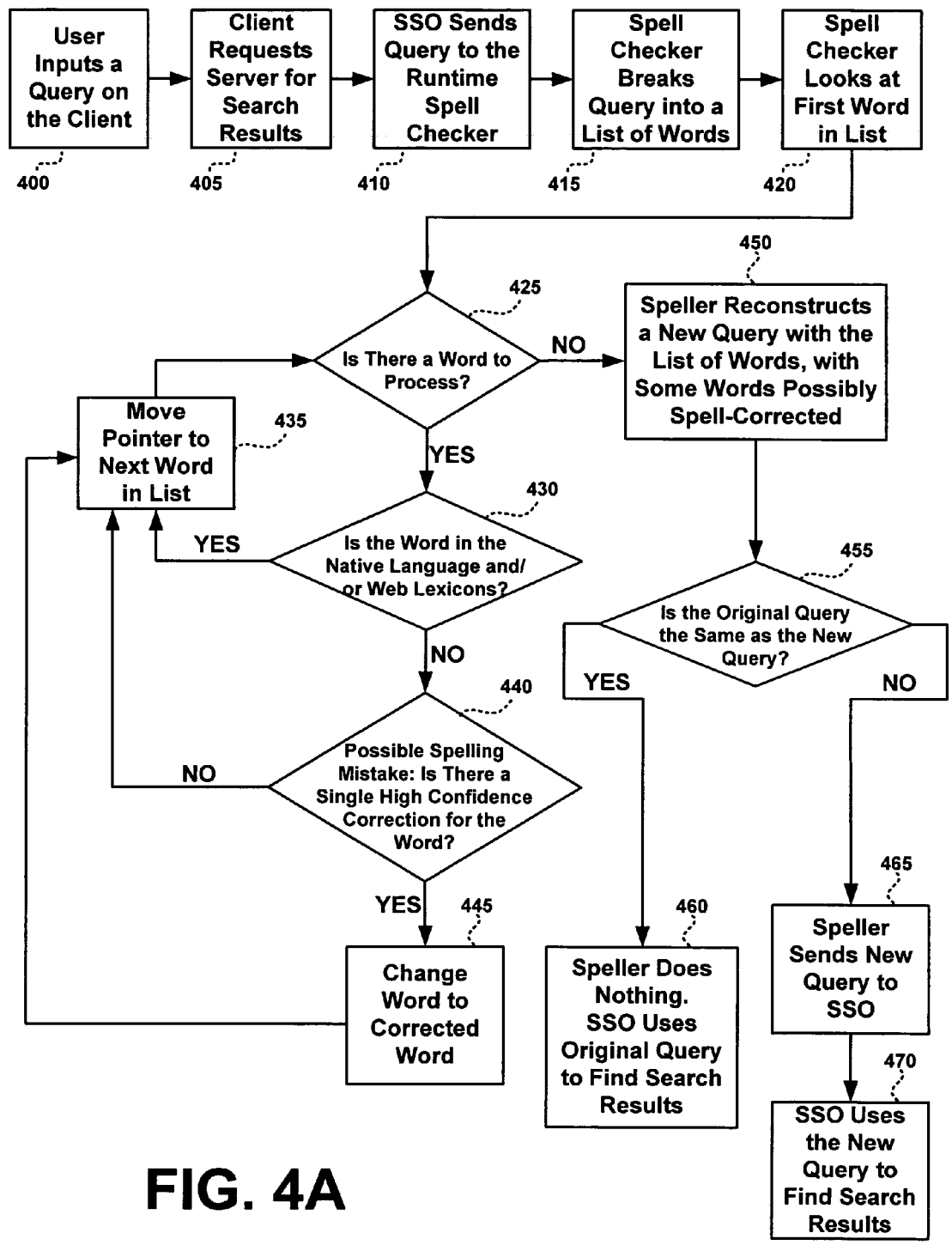
FIG. 4A illustrates an exemplary embodiment of the spelling check/correct component of the present invention in connection with a search engine service.

FIG. 4A illustrates an exemplary embodiment of the spelling check/correct component of the present invention in connection with a search engine service. At 400, a user enters a query on the client computing device. At 405, the client computing device request that the server provide a service, such as search engine results, in connection with the input query. At 410, SSO 350 sends a query to the runtime spell checker 360. At 415, runtime spell checker 360 breaks the query into a list of words, if there are a plurality of words in the query. At 420, the runtime spell checker 360 examines the first word in the list of words generated at 415. At 425, a loop begins for each word in the list of words. If there is a word to process, at 430, the word is checked against the lexicon sources, e.g., the native language and Web lexicons. If the word is in one of the lexicons, then at 435 a pointer to the various words in the list of words is moved to the next word in the list, and the flow returns to 425 to determine if any further processing of words remains. If, at 430, the word is not in any of the lexicons, then at 440, the possibility of spelling mistake is recognized. Thus, at 440, an algorithm is implemented that determines whether there is a single high confidence correction for the word. If not, the flow proceeds to 435 where the pointer to the list of words is moved to the next word in the list and then to 425 again. If there is a single high confidence correction for the word, then at 445 the word is changed to the corrected word before proceeding to 435 where the pointer to the list of words is moved to the next word in the list and to 425 thereafter.

Once all of the words have been processed according to this procedure, at 425, it is determined that there are no more words to analyze for correction in the list. At 450, the runtime spell checker 360 reconstructs a new query with the list of words, as possibly spell-corrected during the processing of 425 to 445. At 455, it is determined whether the query as reconstructed at 450 is the same as the original query input at 400 and segmented into a list of words at 415. If the two queries are the same, then the runtime spell checker 360 does nothing, and the SSO 350 utilizes the original query to find search results from search engine 370. If the two queries are not the same, i.e., if at least one word of the input query has been corrected with high confidence, then the runtime spell checker 360 sends the newly formed query to SSO 350 at 465, which query the SSO 350 uses at 470 to find search results from search engine 370.

From the user perspective, the present invention provides a seamless auto-correct operation for a query input. For instance, the user types in a query Q to the search engine. The system automatically checks for spelling mistakes, checking the query Q against the unified dictionary 340, which is the union of the words in the general English lexicon and the Web English lexicon. If there are no spelling mistakes, i.e., if all the words in the query Q are in the unified dictionary, then Q is left unchanged and passed to all data providers. If there are spelling mistakes, i.e., if the query Q contains one or more words that are not in the unified dictionary, then query Q is spell-corrected word by word.

When a misspelled word is discovered in accordance with the present invention, an algorithm is performed to ensure that if a correction is to be made, that it be a correction made with high confidence. In an exemplary embodiment, the algorithm looks for a close match, or a nearest neighbor. The algorithm further ensures that there is only one nearest neighbor that is a close match to the misspelled word because if there are more than one we do not have confidence in making a unique correction.

For instance, each word W that is not in the unified dictionary is sent to the spelling correction component 360. The spelling component 360 looks for possible corrections from the general English lexicon, and returns zero or more ranked alternatives W1, W2, W3 . . . etc, each with a score S1, S2, S3 . . . respectively. The score measures how close the proposed alternative is to the actual query word where a higher score means that the word is closer. In this example, W1 is closest to W, W2 next closest, etc. Then, in accordance with the present invention, a high-confidence alternative is defined for the query word W as follows.

The present invention is not limited to any particular spelling algorithm. There are several well known English speller algorithms that may be used in accordance with the present invention. A speller in accordance with the invention can be any proven speller algorithm. As with many design choices, there are tradeoffs involved. For instance, an existing speller advantageously accommodates growing lexicons and misspelling types. The present invention also makes provision for speller algorithms for international markets operating on international lexicon data.

Figure 4B:
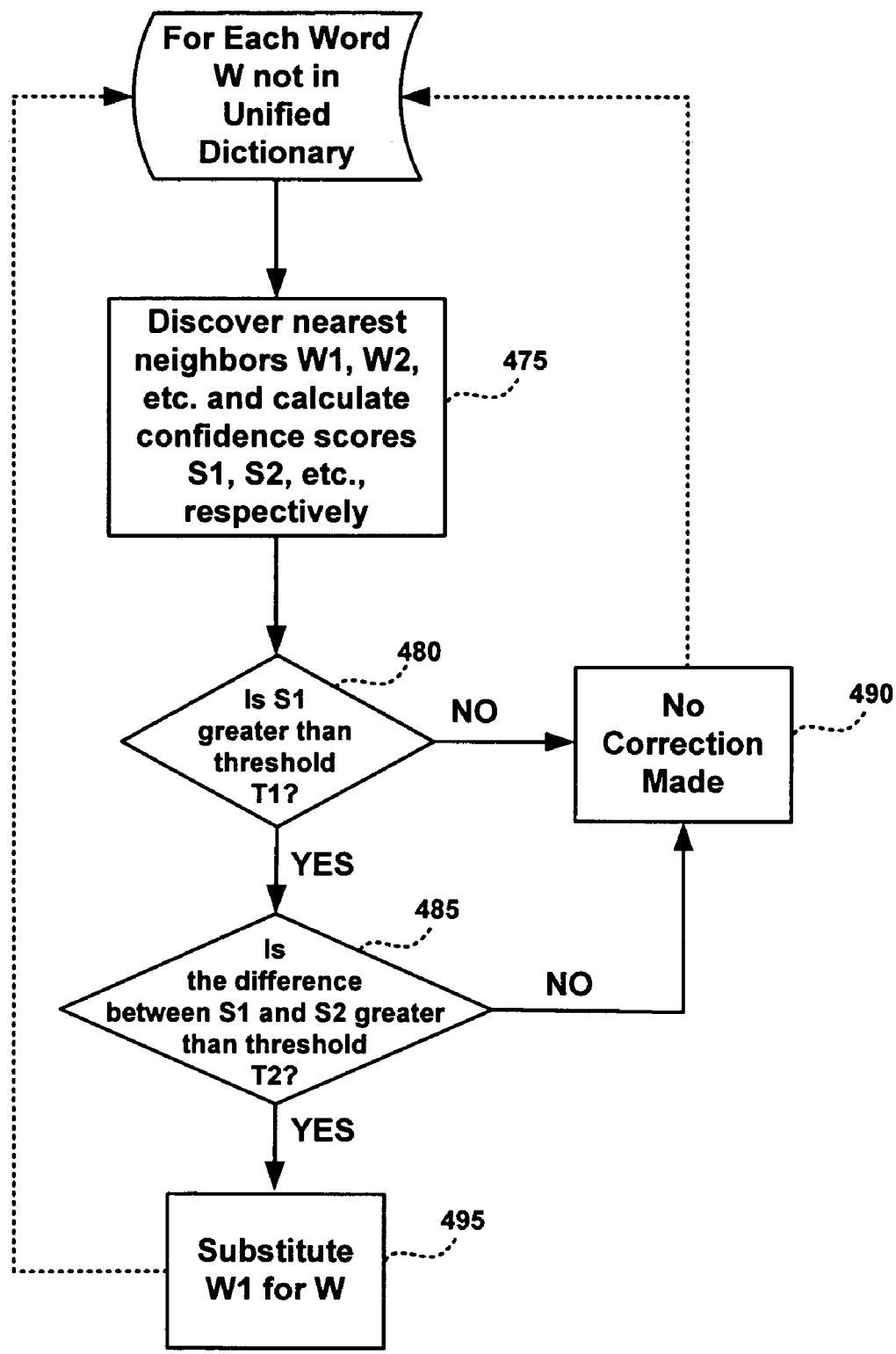
FIG. 4B illustrates exemplary processing for confidence determinations for potential auto-correct candidates in accordance with the present invention.

FIG. 4B illustrates exemplary processing for the confidence determinations of the invention. For each word W not in the unified dictionary 340, at 475, the runtime spell checker 360 discovers the nearest neighbor words W1, W2, etc. that are close in spelling to the word W and calculates corresponding confidence scores S1, S2, etc. for the words. At 480, if none of the scores S1, S2, etc. are higher than a first threshold T1, then the algorithm is finished for that word W and no correction is made at 490 before proceeding to the next misspelled word. If there is at least one word W1, W2, etc. that has a score S1, S2, etc. higher than T1, than at 485, the system determines whether the distance between the two closest near neighbors is sufficiently great. If the distance between the two closest near neighbors is sufficiently great, then there is little ambiguity of choice as to the proper word to choose for auto-correct purposes, since W1 is distinctly the closest choice and thus at 495, W1 is substituted for W before proceeding to analyze the next misspelled word. If, however, S1 and S2 are reasonably close scores, i.e., if S1 is not sufficiently different than S2, then the system presumes that the user's intent may not be extracted with sufficient assurance that W1 is a better choice than W2, and neither W1 nor W2 is chosen and the flow proceeds to 490. Thus, the invention provides two levels of assurance. First, the invention ensures that the score S1 is better than some threshold, so that no outlandish alternative for any word W is proposed, and second, the invention ensures that the absolute difference between the top two scores S1 and S2 is large enough, so that W1 is the clear choice as an alternative to W.

In another exemplary embodiment, if there are zero alternatives proposed by runtime spell checker 360, the system indicates that there is no clear high-confidence alternative and no correction is made. If only one alternative W1 is proposed, then the single alternative W1 is the high-confidence alternative, if the score S1 for W1 is greater than T1. If a high-confidence W1 is identified for the word W, W1 is substituted for W in the query Q. If no such high-confidence alternative is identified, the word W is left unchanged. When all the words in the query have been processed, with word substitutions being made where available, the modified query is passed to all service providers. In another exemplary embodiment, punctuation, numbers, etc. and other non-spelling related query syntax are left unmodified.

Figure 4C:
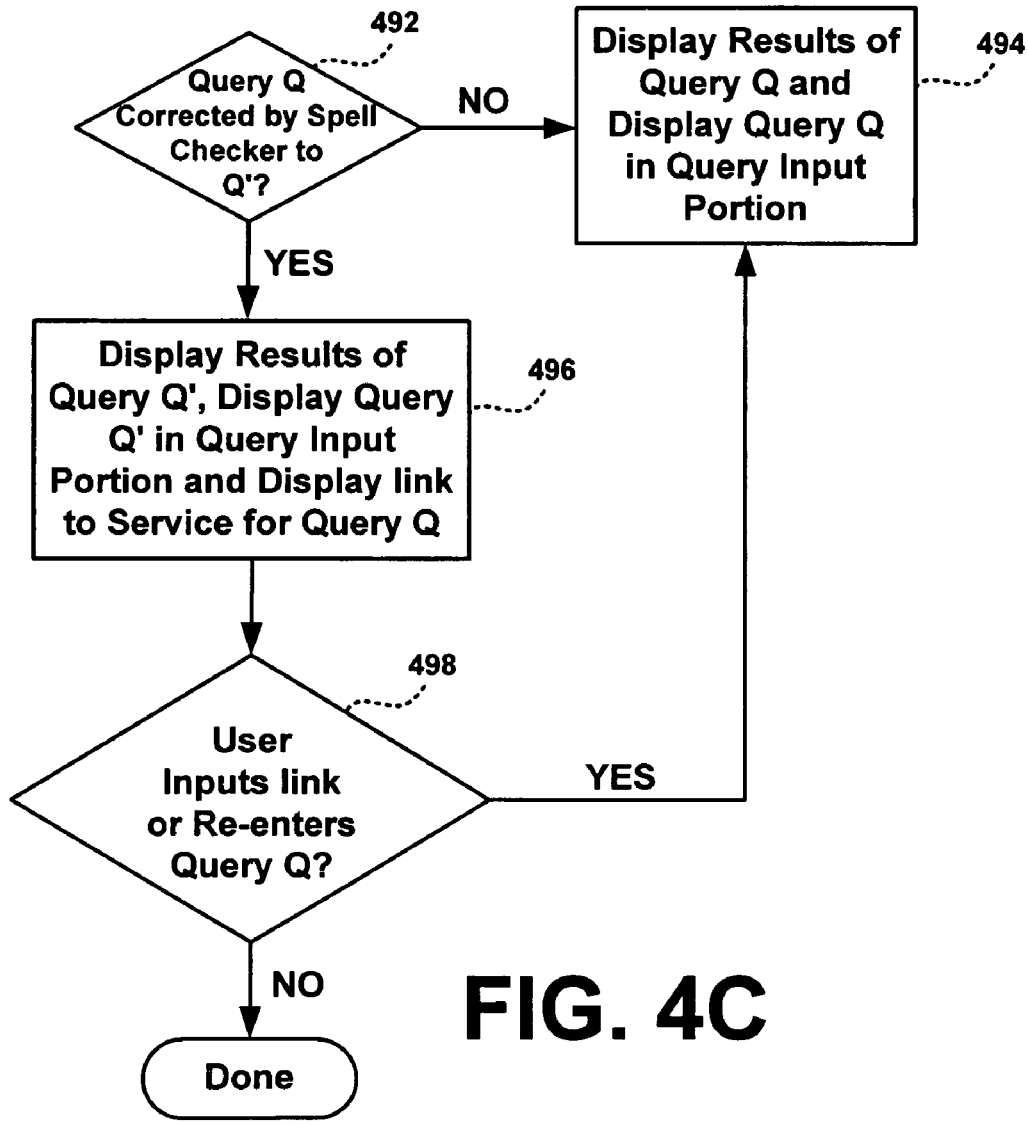
FIG. 4C illustrates exemplary display techniques in accordance with a UI rendering and feedback tracking component of the present invention.

As mentioned in connection with FIG. 3, a UI rendering and feedback tracking component 380 resides on SSO 350, which aids in displaying the spell-corrected query. In an exemplary embodiment, as illustrated in FIG. 4C, at 492, when it is determined that there is no auto-corrected change to the query Q, then at 494, there is no change to the standard way of displaying results, or the query, in the query box. When at 492 it is determined that there has been a correction to the query from Q to Q', then at 496, the corrected query Q' is displayed in the query box(es), a link is added near or below the query box with a message that indicates that the original query Q may be selected for search in the unlikely event that the auto-correction was in error. Such a message might indicate a hyperlink with text "Do not correct spelling. Search for Q." Thus, at 498, if the user is happy with the results given for Q', the invention has succeeded in seamlessly providing the correct results to the user despite the error in text-based query entry and the flow ends; however, if the user is unhappy with the results given for Q', the invention provides the user with multiple ways of re-inputting Q for results based upon Q. At 498, for example, the user may re-enter the query Q or input the link near the query box discussed above, and the flow will proceed to 494 whereby query Q is processed and the results of query Q and query Q are displayed as if no auto-correction took place.

If the user retypes query Q in the query box or inputs the link that forgoes the auto-correction, the system of the invention assumes that the user really wants to search on Q, and thus the query Q is reprocessed without going through the spelling checking/correction code. It is of note that implicit negative feedback about the particular auto-correction may be extracted from this user behavior. With this kind of negative feedback about the auto-correct process, a user's behavior can be tracked, and that feedback may be used to control the suggestion and prioritization of alternatives provided in the future for this query Q, possibly by de-emphasizing the confidence score associated with the words auto-corrected to form query Q'. Also, when the user does not override the auto-correction, this provides implicit positive feedback that the auto-correction feature has worked well, and so similarly, the system may utilize this positive feedback to control the suggestion and prioritization of alternatives provided in the future for the query Q, perhaps providing greater weight to the words that were auto-corrected to form query Q'.

There are several ways in which a spell checking component in accordance with the present invention could be plugged into a computing system. In one non-limiting embodiment, the runtime extension system described in the 'zzz application is leveraged whereby a runtime extension plug-in component reads the original query, autocorrects the query according to the above-described techniques, and appends the correction onto the internal query parameter string as a name/value pair.

Figure 5A:
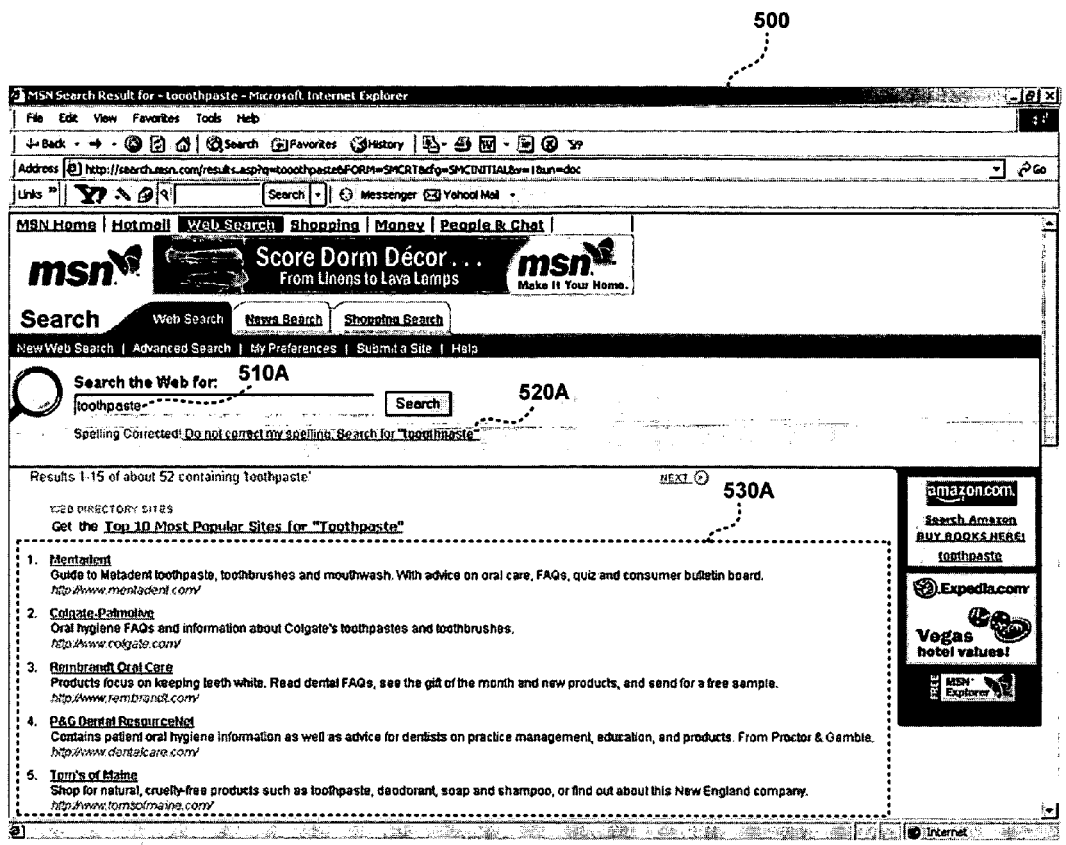
FIGS. 5A through 5D illustrate exemplary implementations of and various aspects of a user interface utilizing runtime spell correction in accordance with the present invention.
Figure 5B:
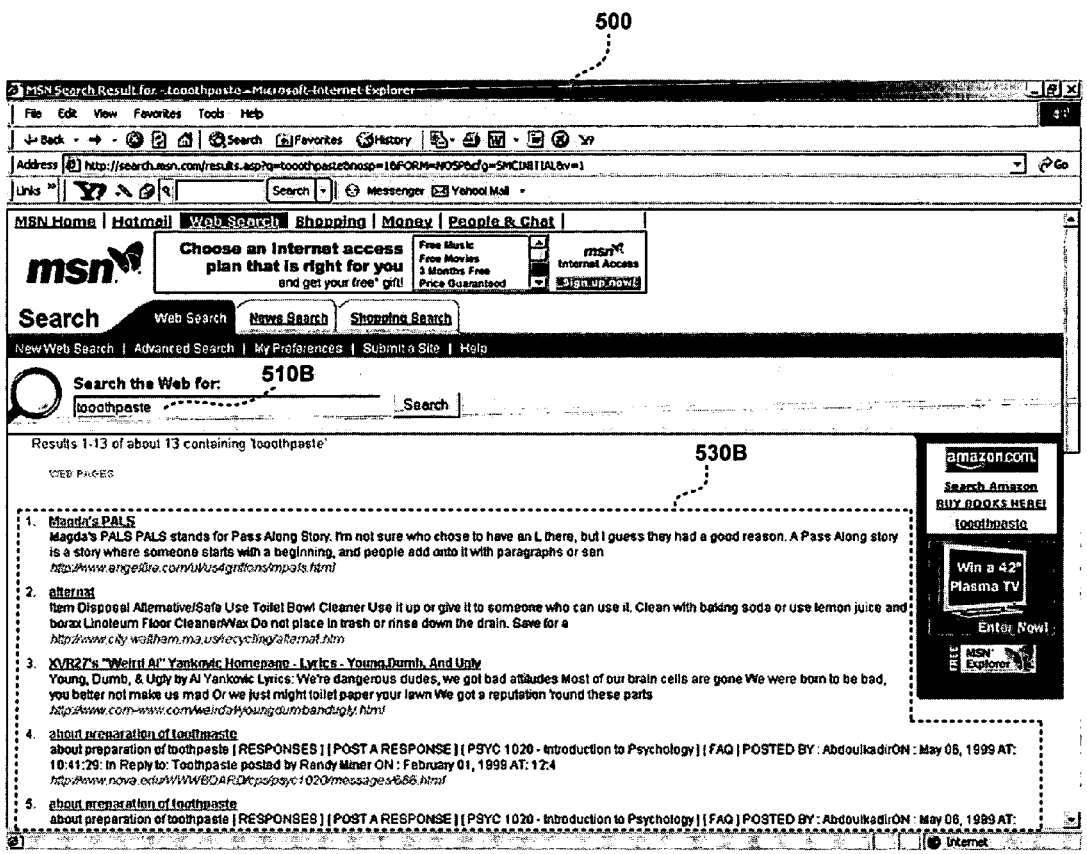

FIGS. 5A and 5B are exemplary implementations of a user interface utilizing runtime spell correction in accordance with the present invention. FIG. 5A illustrates an exemplary search engine user interface 500 in which the user has previously mis-entered "tooothpaste" into the search engine, wherein the auto-correction of the runtime spell checker 360 has auto-corrected the query input 510A to "toothpaste." Results 530A are for the auto-corrected query "toothpaste." Link 520A highlighted below query input 510A illustrates an exemplary way the user may search on the original query "tooothpaste" again if our correction was wrong. FIG. 5B illustrates what happens from FIG. 5A when the user inputs link 520A. By inputting link 520A, or by retyping "tooothpaste," the user has indicated that no auto-correction is desired. Even though "tooothpaste" is still misspelled, the second time around, the SSO 350 bypasses the auto-correction of runtime spell checker 360, and results 530B are displayed as if no auto-correction had occurred. Also, query input 510B is returned to "tooothpaste" as intended.

Thus, the present invention automatically corrects misspelled queries. The invention converts the misspelled queries into valid ones only where a high confidence exists for a single choice from alternatives. While the thresholds T1 and T2 described in FIG. 4B may be adjusted for the needs of a service, preferably, a very high bar is set for T1 and T2 for auto-correction purposes. The invention additionally provides a plurality of mechanisms by which the user can override the auto-correction afterwards.

Figure 5C:
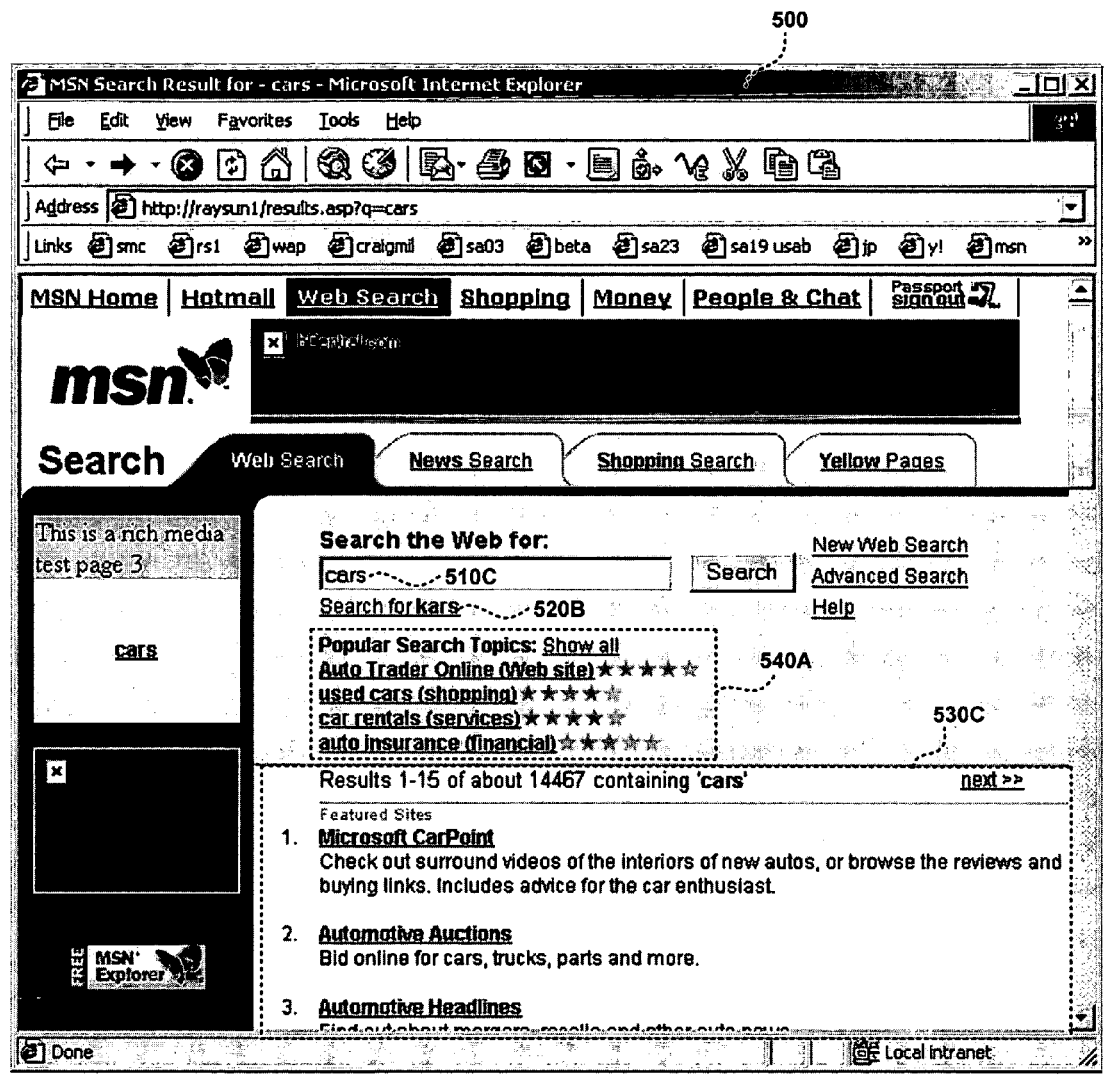
Figure 5D:
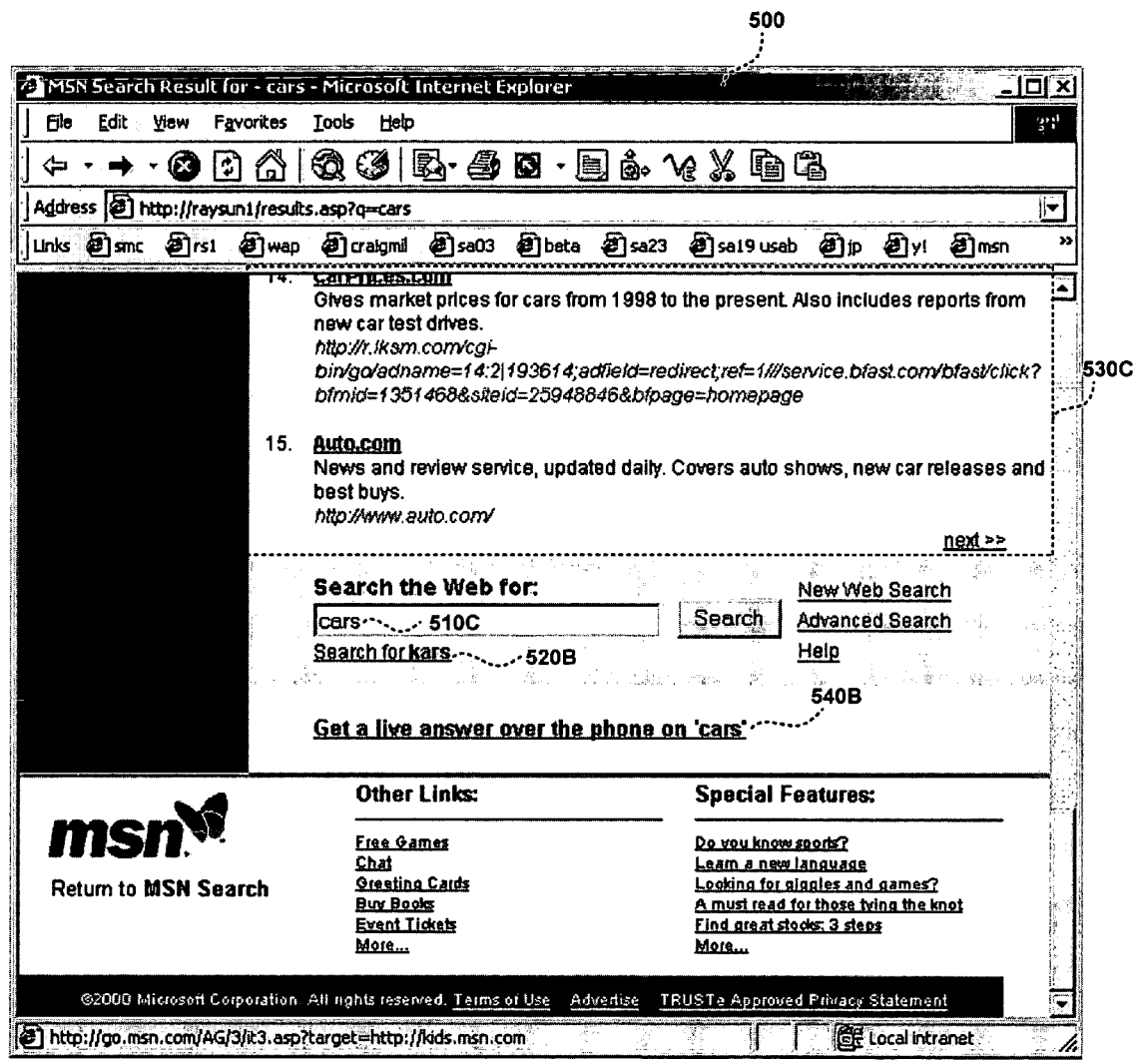

FIGS. 5C and 5D illustrate additional exemplary scenarios wherein a user utilizes a search engine 500 in accordance with the present invention. In FIG. 5C, the user has mis-typed a query for "cars" as "kars." With a sufficiently confident auto-correction, the user's query is automatically changed to "cars," as shown by 510C. The user thus receives great results 530C for "cars." Without the auto-correct function, the user would have received poor results, would have had to recognize the mistake, and would then have to retype the query. In the rare event that the auto-correct is incorrect, the user may still click the link beneath the input box 520B labeled "Search for 'kars'" and the user receives results for "kars" as if no auto-correct had performed. Links 540A illustrate additional services that may be tailored to the auto-corrected query "cars" such as links to used cars, rental cars, insurance, etc. FIG. 5D illustrates the window 500 of FIG. 5C wherein the user has scrolled to the bottom of the window passed the results 530C. As one can see, the corrected input 510C and the link 520B are repeated at the bottom of the search results 530C, and additional opportunities to present links 540B related to cars are presented.

The spell checking capabilities of the invention by default are enabled for a client machine; however, the present invention also includes the ability to turn on/off spell checking, e.g., by setting the spell checking feature on or off for the user or for the client machine, e.g., via a general user profile or preference store, or under a preference store for the service itself.

As mentioned above, while exemplary embodiments of the present invention have been described in connection with various computing devices and network architectures, the underlying concepts may be applied to any computing device or system in which it is desirable to perform runtime spelling analysis of network-based services. Thus, the techniques for auto-correcting query entries in accordance with the present invention may be applied to a variety of applications in which text data is processed at run-time. One of ordinary skill in the art will recognize that values for threshold settings and other settings in accordance with the present invention are design choices that may vary from application to application depending upon the tradeoffs that are implicated. Further while particular names for software components and words for spelling mistakes are utilized herein for distinguishing purposes, any name would be suitable and the present invention does not lie in the particular nomenclature utilized.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the runtime spell checking of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the run-time spell checking capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary embodiments of the invention are described in the context of search engines, one skilled in the art will recognize that the present invention is not limited thereto, and that the methods of runtime spelling analysis and correction, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather should be construed in breadth and scope in accordance with the appended claims.

What is claimed is:

1. A method for providing runtime automatic spelling analysis and correction in a computer system in connection with a service utilizing a query input mechanism, comprising:

receiving from a client computing device a query comprising at least one word;

analyzing the spelling of said at least one word and determining whether said at least one word has a mistake;

identifying at least one alternative word that could be used to replace at least one word having a mistake;

assessing said at least one alternative word with regard to said at least one word with said mistake to derive a confidence calculation, said confidence calculation based at least in part on a set of historical data that indicates said at least one word having the mistake was replaced by said at least one alternative word in a prior query submitted by the client;

performing a query operation utilizing said at least one alternative word if the derived confidence calculation exceeds a predetermined threshold, otherwise performing a query operation utilizing said at least one word having the mistake; and sending the results of the query to the client computing device for display.

2. The method of claim 1, wherein performing a query operation utilizing said at least one word having the mistake comprises:

transmitting link data to the client computing device for displaying a link on the client computing device, wherein the link is operable to transmit a request to perform a query with said at least one alternative word.

3. The method of claim 1, wherein performing a query operation utilizing said at least one alternative word comprises:

transmitting link data to the client computing device for displaying a link on the client computing device, wherein the link is operable to transmit a request to perform a query with said at least one word having the mistake.

4. The method of claim 1, further comprising:

transmitting a request to the client to select whether to continue the query with the at least one alternative word or to continue the query with the at least one word having the mistake if the derived confidence calculation is within a predetermined range of the predetermined threshold, and then performing the service in accordance with the selection.

5. The method of claim 4, wherein performing a query operation utilizing said at least one word having a mistake comprises:

transmitting link data to the client computing device for displaying a link on the client computing device, wherein the link is operable to submit a request to perform a query with said at least one alternative word.

6. The method of claim 4, wherein performing a query operation utilizing said at least one alternative word comprises:

transmitting link data to the client computing device for displaying a link on the client computing device, wherein the link is operable to submit a request to perform a query with said at least one word having the mistake.

7. A computer-readable medium having computer readable instructions stored upon for providing runtime automatic spelling analysis and correction in connection with a service utilizing a query input mechanism, said computer-readable instructions comprising instructions for:

receiving from a client computing device a query comprising at least one word;

analyzing the spelling of said at least one word and determining whether said at least one word has a mistake;

identifying at least one alternative word that could be used to replace at least one word having a mistake;

assessing said at least one alternative word with regard to said at least one word with said mistake to derive a confidence calculation, said confidence calculation based at least in part on a set of historical data that indicates said at least one word having the mistake was replaced by said at least one alternative word in a prior query submitted by the client;

performing a query operation utilizing said at least one alternative word if the derived confidence calculation accedes a predetermined threshold, otherwise performing a query operation utilizing said at least one word having the mistake; and sending the results of performing the service to the client computing device for display.

8. The computer-readable medium of claim 7, wherein the instructions for performing a query operation utilizing said at least one word having the mistake comprises:

instructions for transmitting link data to the client computing device for displaying a link on the client computing device, wherein the link is operable to transmit a request to perform a query with said at least one alternative word.

9. The computer-readable medium of claim 7, wherein the instructions for performing a query operation utilizing said at least one alternative word comprises:

instructions for transmitting link data to the client computing device for displaying a link on the client computing device, wherein the link is operable to transmit a request to perform a query with said at least one word having the mistake.

10. The computer-readable medium of claim 7, further comprising:

instructions for transmitting a request to the client to select whether to continue the query with the at least one alternative word or to continue the query with the at least one word having the mistake if the derived confidence calculation is within a predetermined range of the predetermined threshold, and then performing the service in accordance with the selection of said user.

11. The computer-readable medium of claim 10, wherein the instructions for performing a query operation utilizing said at least one word having a mistake comprises:

instructions for transmitting link data to the client computing device for displaying a link on the client computing device, wherein the link is operable to submit a request to perform a query with said at least one alternative word.

12. The computer-readable medium of claim 10, wherein the instructions for performing a query operation utilizing said at least one alternative word comprises:

instructions for transmitting link data to the client computing device for displaying a link on the client computing device, wherein the link is operable to submit a request to perform a query with said at least one word having the mistake.

13. A computer-implemented system for providing runtime automatic spelling analysis and correction in connection with a service utilizing a query input mechanism, said system comprising at least one subsystem for:

receiving from a client computing device a original query comprising at least one word;

analyzing the spelling of said at least one word and determining whether said at least one word has a mistake;

if said at least one word has a mistake, identifying at least one alternative word that could be used to replace said at least one word having the mistake;

assessing said at least one alternative word with regard to said at least one word with a mistake to derive a confidence calculation, said confidence calculation based at least in part on a set of historical data that indicates said at least one word having the mistake was replaced by said at least one alternative word in a prior query submitted by the client;

performing a query operation utilizing said at least one alternative word if the derived confidence calculation accedes a predetermined threshold, otherwise performing a query operation utilizing said at least one word having the mistake; and sending the results of performing the service to the client computing device for display.

14. The system of claim 13, wherein the at least one subsystem for performing a query operation utilizing said at least one word having the mistake comprises:

at least one subsystem for transmitting link data to the client computing device for displaying a link on the client computing device, wherein the link is operable to transmit a request to perform a query with said at least one alternative word.

15. The system of claim 13, wherein the at least one subsystem for performing a query operation utilizing said at least one alternative word comprises:

at least one subsystem for transmitting link data to the client computing device for displaying a link on the client computing device, wherein the link is operable to transmit a request to perform a query with said at least one word having the mistake.

16. The system of claim 13, further comprising:

at least one subsystem for transmitting a request to the client to select whether to continue the query with the at least one alternative word or to continue the query with the at least one word having the mistake if the derived confidence calculation is within a predetermined range of the predetermined threshold, and then performing the service in accordance with the selection.

17. The system of claim 16, wherein the at least one subsystem for performing a query operation utilizing said at least one word having a mistake comprises:

at least one subsystem for transmitting link data to the client computing device for displaying a link on the client computing device, wherein the link is operable to submit a request to perform a query with said at least one alternative word.

18. The system of claim 16, wherein the at least one subsystem for performing a query operation utilizing said at least one alternative word comprises:

at least one subsystem for transmitting link data to the client computing device for displaying a link on the client computing device, wherein the link is operable to submit a request to perform a query with said at least one word having the mistake.

* * * * *